(12) United States Patent
Blakeney, II et al.

(10) Patent No.: US 6,466,802 B1
(45) Date of Patent: *Oct. 15, 2002

(54) METHOD AND APPARATUS FOR PERFORMING PREFERRED SYSTEM SELECTION

(75) Inventors: Robert D. Blakeney, II, Steamboat Springs, CO (US); Paul T. Williamson, San Diego, CA (US); Jan C. Ault, Santee, CA (US); John R. Sorenson, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,198

(22) Filed: Apr. 21, 2000

Related U.S. Application Data

(63) Continuation of application No. 08/626,744, filed on Mar. 27, 1996, now Pat. No. 6,085,085.

(51) Int. Cl.$^7$ ............................. H04B 1/38; H04M 1/00; H04Q 7/20
(52) U.S. Cl. ..................... 455/552; 455/432; 455/456; 455/426
(58) Field of Search ............................... 455/426, 432, 455/456, 552, 422, 425, 436, 437, 440, 434, 435, 441, 443, 444, 524–525, 186.1

(56) References Cited

U.S. PATENT DOCUMENTS

| 4,112,257 A | | 9/1978 | Frost et al. |
|---|---|---|---|
| 4,756,007 A | | 7/1988 | Qureshi et al. |
| 4,763,322 A | | 8/1988 | Eizenhofer |
| 4,795,210 A | | 1/1989 | Milat |
| 4,905,301 A | | 2/1990 | Krolopp et al. |
| 4,916,728 A | | 4/1990 | Blair |
| 5,020,091 A | | 5/1991 | Krolopp et al. |
| 5,123,111 A | | 6/1992 | Delroy et al. |
| 5,239,294 A | | 8/1993 | Flanders et al. |
| 5,267,244 A | | 11/1993 | Messerschmitt et al. |
| 5,301,359 A | | 4/1994 | Van Der Heuvel et al. |
| 5,442,806 A | | 8/1995 | Barber et al. |
| 5,537,674 A | | 7/1996 | Kishimoto et al. |
| 5,586,338 A | | 12/1996 | Lynch et al. |
| 5,613,213 A | | 3/1997 | Naddell et al. |
| 6,085,085 A | * | 7/2000 | Blakeney, II et al. ........ 455/426 |

* cited by examiner

Primary Examiner—Nguyen T. Vo
(74) Attorney, Agent, or Firm—Phillip Wadsworth; Kent D. Baker; Byron Yafuso

(57) ABSTRACT

A method and apparatus for selecting a communication system in accordance with the geographic region in which the subscriber station is located is described. Upon successful acquisition, a system determination processor examines the received system identification information and compares it with system identification information stored in a universal system table to determine the geographical region of the identified communication system. The system determination processor then determines whether the acquired system is the most desirable system for use in the geographical region. If it is the most desirable system for use in the geographical region, the system determination processor selects the acquired system for providing service. If it is not the most desirable system for use in the geographical region, the subscriber station attempts to acquire a more desirable system using information from the universal system table.

33 Claims, 4 Drawing Sheets

METHOD AND APPARATUS FOR PERFORMING PREFERRED SYSTEM SELECTION

CROSS REFERENCE

This application is a continuation of Ser. No. 08/626,744, now U.S. Pat. No. 6,085,085, filed Mar. 27, 1996, now allowed, entitled "Method and Apparatus for Performing Preferred System Selection."

BACKGROUND OF THE INVENTION

I. Field of the Invention

The present invention relates to communication systems. More particularly, the present invention relates to a novel and improved method and apparatus for selecting a preferred communication system in a subscriber station capable of operation in a plurality of geographical regions.

II. Description of the Related Art

As mobile communication systems become more prevalent in society the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, and is incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention and is incorporated by reference herein.

When the user of a subscriber station travels from one geographic area to another, the subscriber station must select a communications system upon which to conduct services. There are two means by which a user may operate his subscriber station in differing geographic regions. By the first method, the user subscribes to communications services in a variety of regions. Thus, the subscriber station needs only to seek out a communications system to which the user subscribes and may provide services using any of those service providers.

Alternatively, the user may communicate by means of roaming service. Mobile communications providers negotiate contracts among themselves to provide services known as "roaming" to their customers. A "roamer" is a subscriber station which requires service in a system which is operated by a mobile communications service provider other than the ones to which the user subscribes. Currently, when a subscriber station is roaming, a signal indicative of the roaming condition is provided to the user. A roaming determination is made as a result of a comparison of the system identification (SID) of the subscribed system or systems with the SID of the system providing service which is broadcast by that system. This alerts the user of the subscriber station that the service being provided is accruing roaming charges.

Because the subscriber station is generally without knowledge of the user's geographic location, it must select the system (from the possible communications systems of an area) which provides the optimum service to the user in terms of cost and quality of service. As the number of regions in which the user wishes to be able to operate increases, so does the number of different communications systems that the subscriber station must attempt to acquire. The present invention provides a method and apparatus for selecting the communication system best suited to the user's needs.

The present invention is described in a multi-mode subscriber station, such as is described in detail in U.S. Pat. No. 5,754,542 entitled "METHOD AND APPARATUS FOR SYSTEM DETERMINATION IN A MULTI-MODE SUBSCRIBER STATION", which is assigned to the assignee of the present invention and is incorporated herein by reference. The exemplary embodiment is illustrated in the context of a subscriber station capable of transmitting and receiving CDMA signals and capable of transmitting and receiving analog signals, such as AMPS and NAMPS. The present invention is equally applicable to any digital communication system including TDMA, FDMA and GSM. In addition, the present invention is equally applicable to subscriber stations capable of operation in only one mode (e.g. analog or digital).

SUMMARY OF THE INVENTION

In the present invention, the subscriber station maintains a list of systems, some of which are 'preferred' systems (systems the subscriber station is allowed to use), and some of which are 'negative' systems (systems the subscriber station is not allowed to use). Associated with each system in the list is a system ID (SID), as well as corresponding acquisition parameters (band, frequency, mode, etc.). This list is referred to herein as the universal system table.

The universal system table is maintained in such a manner that the subscriber station can readily determine which systems (preferred or negative) cover common geographical regions. The references to common geographic regions refers to areas of common radio coverage. Moreover, the systems that cover a common geographical region are prioritized (i.e., ranked from most desirable to least desirable). The subscriber station's job is to attempt to acquire service on the most desirable system in the subscriber station's current geographical area. There is no point in trying to acquire service on a system outside of the subcriber station's current geographic region, since systems typically provide service only within a limited geographic region.

The problem is that the subscriber station does not necessarily know where it is when it powers on. Due to roaming, it could be in an entirely different region than it was previously. Therefore, it may not be obvious how to acquire any system, let alone the most desirable system. In the exemplary embodiment of the present invention, the subscriber station maintains a list of the most recently used (MRU) systems. As a first measure, attempting to acquire one of these systems makes a lot of sense, because there is a good chance that the subscriber station is currently somewhere that it has been in the not too distant past.

If the subscriber station cannot acquire an MRU system, then it can try to acquire any preferred system in the universal system table, using the appropriate acquisition parameters. In the exemplary embodiment, the subscriber station first attempts acquisition on the 'easiest' to acquire systems, (e.g., AMPS systems assuming there are any AMPS systems in the universal system table). In the exemplary embodiment, if the subscriber station is unable t5o acquire one of these systems, then the subscriber station attempts to acquire system which is 'most representative' of systems in the universal system table. In other words, the universal system table will probably contain numerous systems which differ only with respect to their SIDs and their geographical regions, but having identical acquisition parameters (e.g., channel number or frequency block designator).

Once the subscriber station acquires a system, the subscriber station can pick up the acquired system's SID from an overhead message. The subscriber station uses the received SID to determine the geographic region in which it is located. In the exemplary embodiment, the subscriber station can obtain this geographic information from the universal system table whether the acquired system is preferred or negative.

If the SID belongs to a preferred system in the universal system table that is a most desirable system within its geographical region, the subscriber station provides service using that system. If the SID of the acquired system belongs to a system in the universal system table that is not a most desirable system within its geographical area, the subscriber station uses the received SID to determine the geographic region in which it is located. The subscriber station attempts to acquire a most desirable system in that geographical area, by sequentially making acquisition attempts on systems in the geographic region from most desirable to least desirable for the region.

If the SID belongs to a system not in the universal system table, the subscriber station attempts acquisition on other systems. The subscriber station may return to this system if the subscriber station fails to acquire a preferred system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
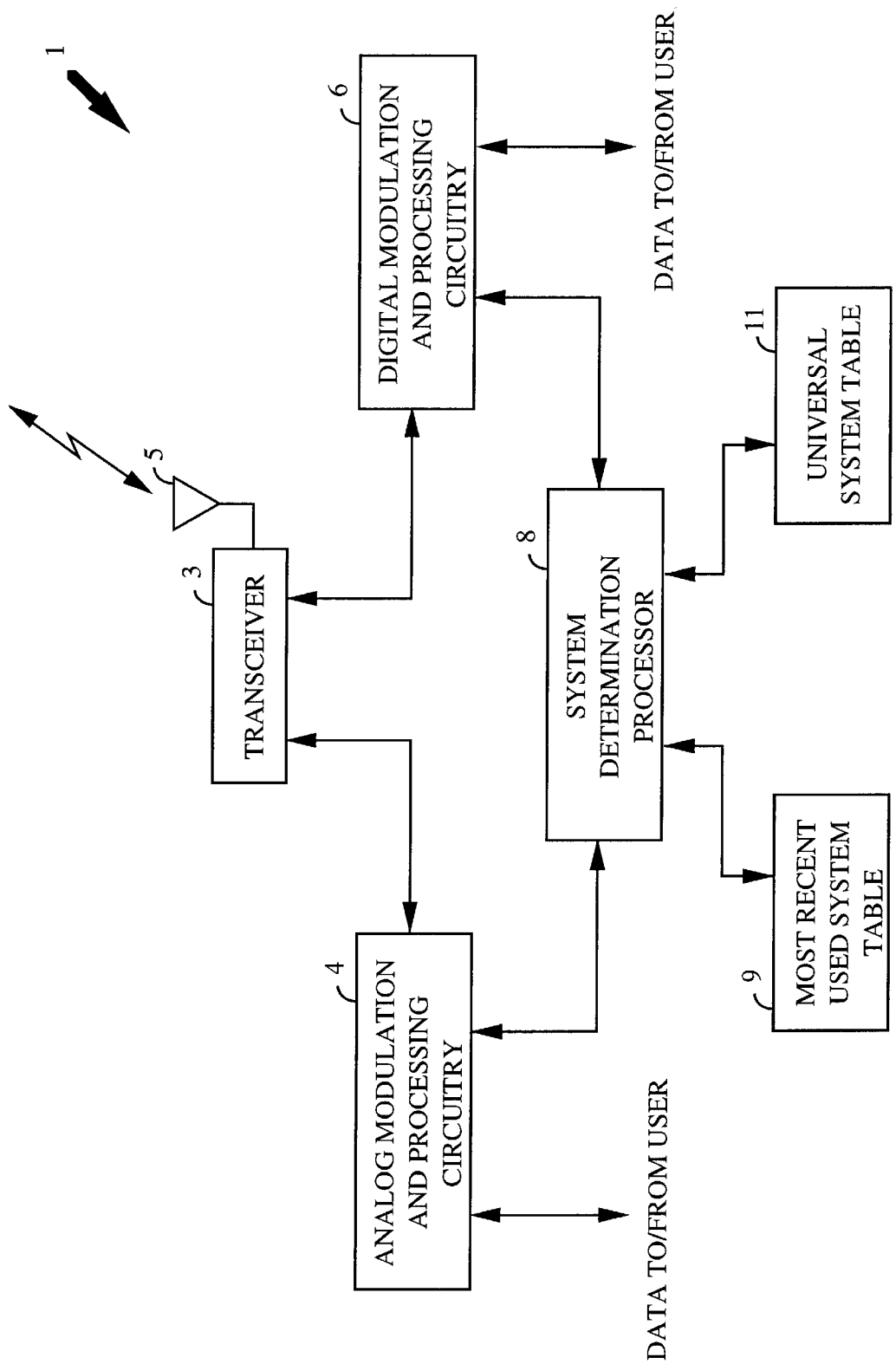
FIG. 1 is a block diagram of the exemplary multi-mode subscriber station in the present invention.

Referring to FIG. 1, when multi-mode subscriber station (MMSS) 1 is in a system determination substate, then the operations are conducted by system determination processor 8. In the system determination substate, system determination processor 8 selects the communication system upon which MMSS 1 is to attempt to perform acquisition and provides the necessary parameters to the acquisition circuitry. System determination processor 8 may be implemented as a microprocessor which functions under a program control as discussed with reference to FIGS. 2A–2C.

In the exemplary embodiment, MMSS 1 is a dual-mode subscriber station capable of both analog transmission and reception, using analog modulation and demodulation and processing circuitry (analog circuitry) 4, and digital transmission and reception, using digital modulation and demodulation and processing circuitry (digital circuitry) 6. In the exemplary embodiment, digital circuitry 6 is code division multiple access (CDMA) transmission and reception circuitry. However, other types of digital communication modes may be employed such as TDMA or GSM. The present invention is applicable to cellular communications systems, personal communication systems (PCS) and any other communication system which may provide service to a subscriber station capable of operation in a plurality of geographic regions.

The design of analog circuitry 4 is well known in the art and is described in detail in *Mobile Cellular Telecommunications Systems* by William C. Y. Lee. The exemplary embodiment of digital circuitry 6 is described in detail in the aforementioned U.S. Pat. Nos. 4,901,307 and 5,103,459.

Most recently used (MRU) table 9 contains a list of communication systems that have been most recently used by MMSS 1. In the exemplary embodiment, MRU table 9 is implemented in non-volatile memory which is retained even after MMSS 1 is powered down. Universal system table 11 contains system parameters for all communication systems which MMSS 1 "knows" exist. In the exemplary embodiment, universal system table 11 contains information regarding both preferred and negative systems and the systems are stored in accordance with their geographic region. In the exemplary embodiment, universal system table 11 is implemented in a non-volatile memory which is retained even after MMSS 1 is powered down.

In the exemplary embodiment, the systems stored in universal system table 11 are grouped according to geographic region, each system listed within a geographic group is then sequentially ordered from most desirable to least desirable. Criteria for ranking systems may, for example, include cost of service, quality of service, support of unique features, etc. For each system, universal system table 11 contains the system identification (SID) along with necessary acquisition parameters including band, frequency, mode and any other parameters necessary to perform acquisition. In the exemplary embodiment, each system listed is tagged with a indication of whether the system is a system the subscriber station is permitted to use (a preferred system) or a system which the subscriber station is not permitted to use (a negative system).

Figure 2A:
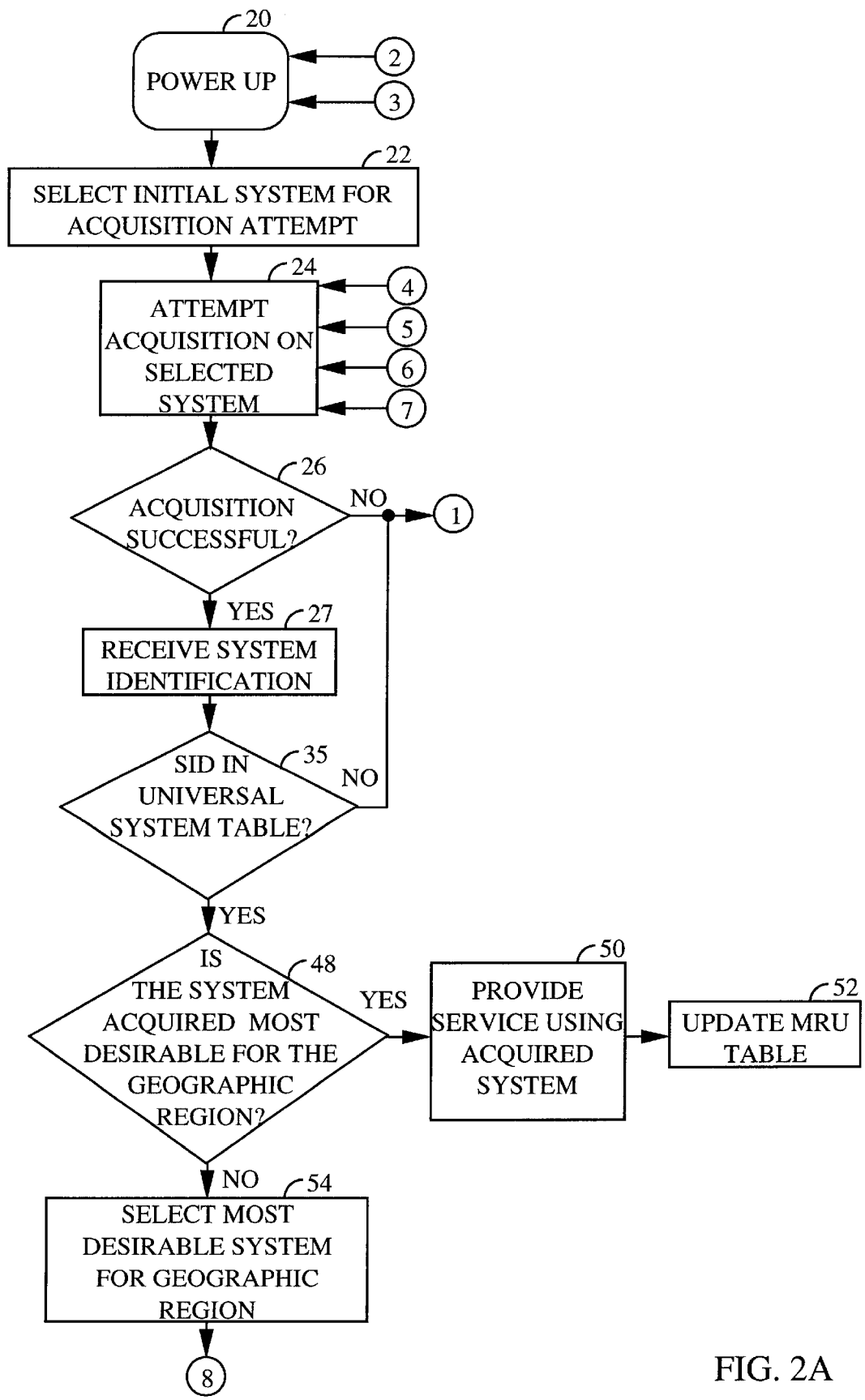
FIGS. 2A–2C is a flow diagram illustrating the exemplary system selection process of the present invention.
Figure 2B:
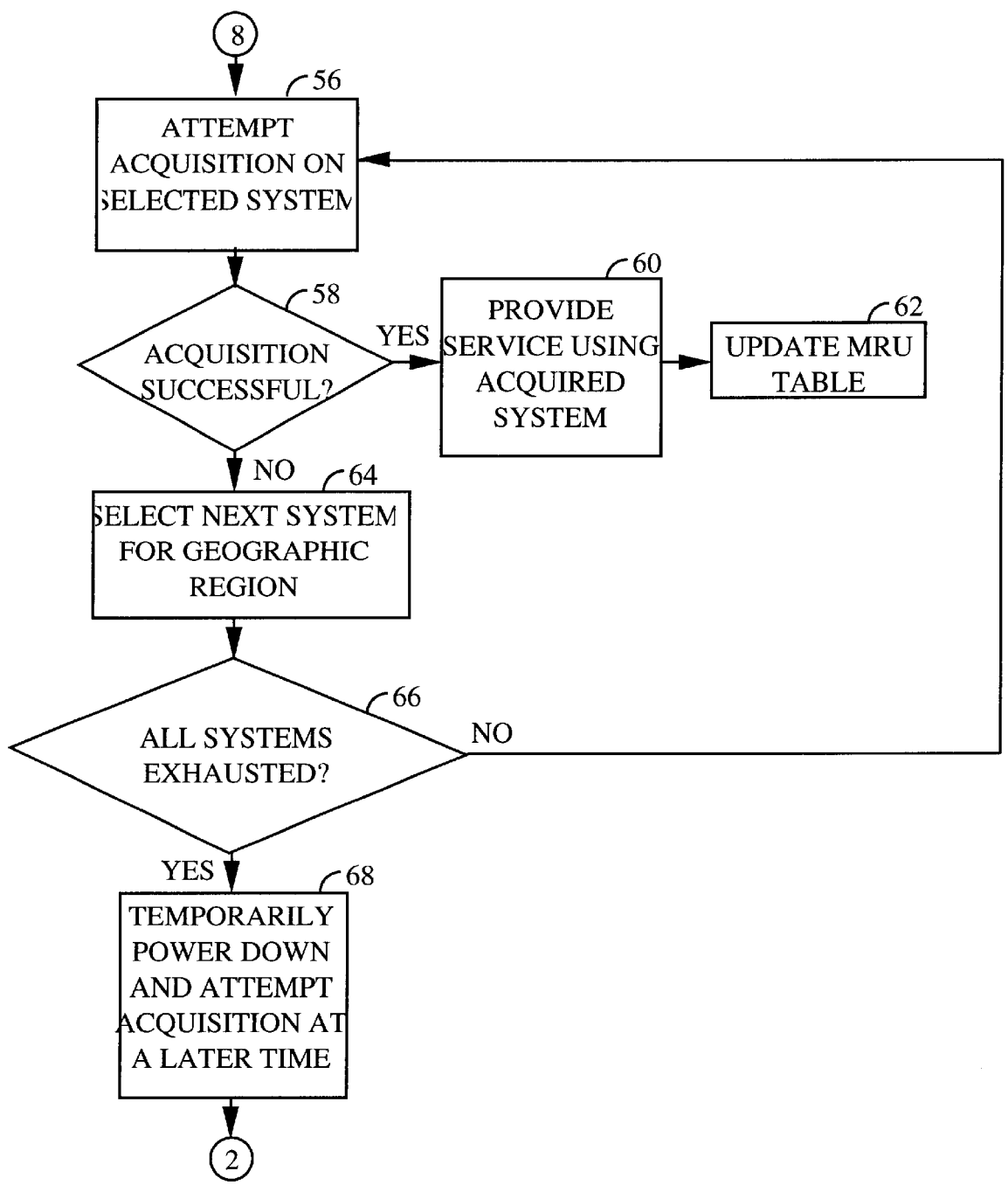
Figure 2C:
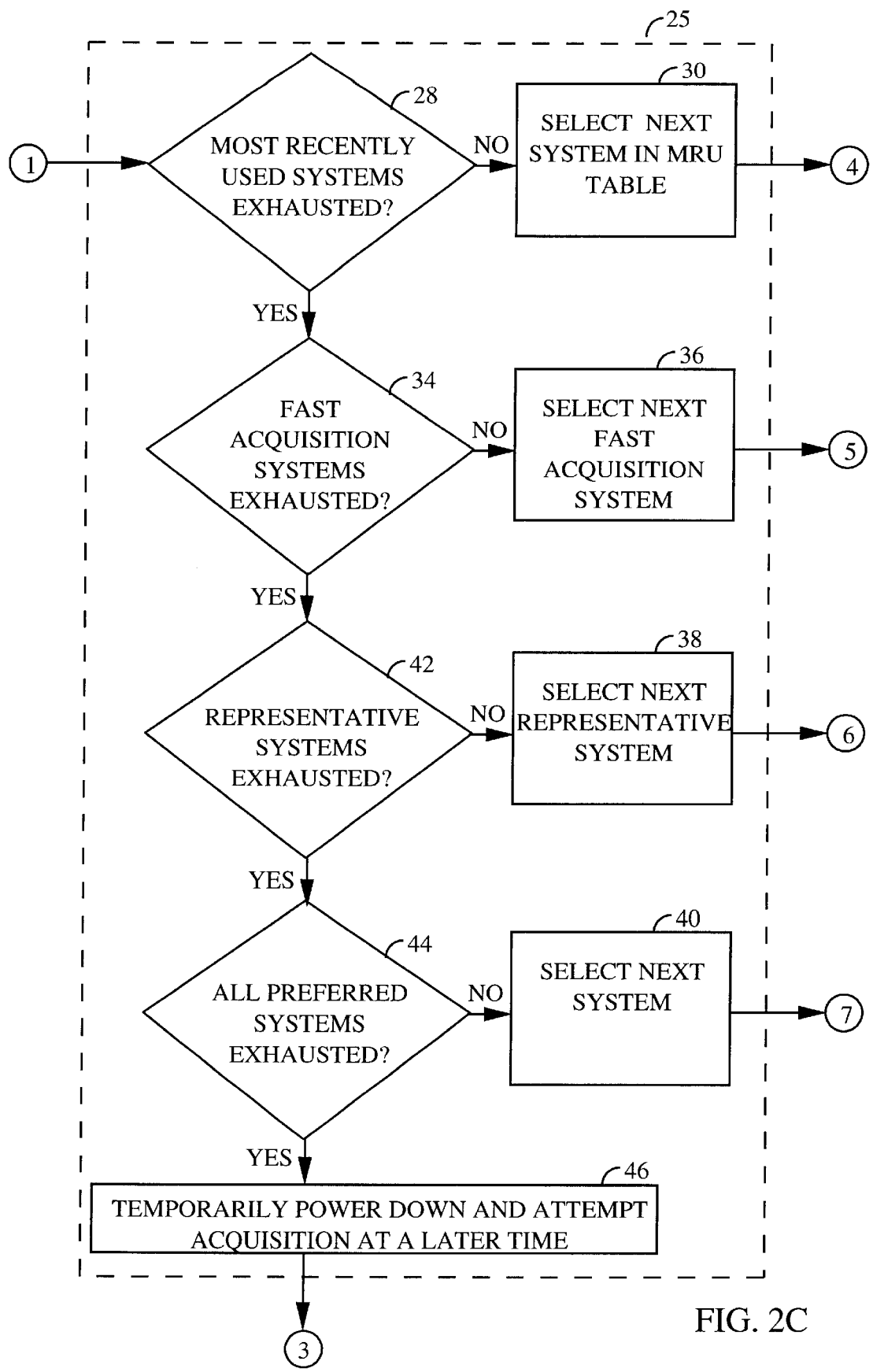

FIGS. 2A–2C are flowcharts illustrating the exemplary method of preferred system selection of the present invention. Upon power up (block 20), MMSS 1 enters the system determination substate and control is handed to system determination processor 8. In block 22, system determination processor 8 selects the initial system upon which to attempt acquisition, which in the exemplary embodiment is selected in accordance with systems listed in MRU table 9. In the exemplary embodiment, system determination processor 8 selects the last system used to provide service as the system for initial acquisition. In an alternative embodiment system determination processor 8 selects the system most frequently used by MMSS 1. In another alternative embodiment, system determination processor 8 selects the home system of MMSS 1.

In block 22, system determination processor 8 retrieves the necessary acquisition parameters from universal system table 11. If the system selected for initial acquisition is an analog system, system determination processor 8 provides acquisition parameters to analog circuitry 4 and provides necessary frequency information to transceiver 3. In block 24, MMSS 1 attempts to acquire the selected analog system.

Transceiver 3 amplifies and down converts the signal (if present) received via antenna 5 in accordance with the frequency information provided by system determination processor 8. Analog circuitry 4 demodulates the signal in accordance with the acquisition parameters provided by system determination processor 8.

In block 22, if the selected system is a digital system, system determination processor 8 provides the necessary acquisition parameters to digital circuitry 6 and provides necessary frequency information to transceiver 3. In the exemplary embodiment, the digital system selected for acquisition is described as a CDMA system although as pointed out previously, the present invention is equally applicable to the acquisition of other digital communication systems. In block 24, MMSS 1 attempts to acquire the selected CDMA system. Transceiver 3 down converts the signal (if present) received via antenna 5 in accordance with frequency information from system determination processor 8. Digital circuitry 6 demodulates the signal in accordance with the acquisition parameters provided by system determination processor 8. Demodulation of a CDMA signal is described in detail in the aforementioned U.S. Pat. No. 5,103,459.

In block 26, if the acquisition attempt is unsuccessful, then control is returned to system determination processor 8 in block 25. In block 25, system determination processor 8 selects the next system to be acquired. In the exemplary embodiment, MMSS 1 first attempts to acquire all systems stored in MRU table 9. If MMSS 1 is unsuccessful at acquiring one of the systems stored in MRU table 9, then MMSS 1 attempts to acquire a set of systems identified to be "easy" to acquire. The easy to acquire systems are selected to be able to provide fast and easy identification of the geographical region, even though they may not be the most desirable systems within their respective geographic regions. In an alternative embodiment, MMSS 1 will first attempt to acquire an AMPS system before attempting to acquire a system in MRU table 9, since the availability of an AMPS system can be easily determined.

If MMSS 1 is unable to acquire an easy to acquire system, then acquisition is attempted on a "representative" system. A representative system is one which has acquisition parameters that are common to a plurality of other systems. Thus, by attempting acquisition on a representative system, MMSS 1 is in reality testing a set of geographical region hypotheses simultaneously. If none of these systems can be acquired, then MMSS 1 exhaustively attempts acquisition on the remaining systems in universal system table 11.

When acquisition of the system selected by system determination processor 8 is unsuccessful, the operation moves to block 28. Block 28 determines whether acquisition has been attempted on all systems in MRU table 9. If there are systems in MRU table 9 upon which acquisition attempts have not been made, then system determination processor 8 selects a system from MRU table 9 and selectively provides the system acquisition parameters to analog circuitry 4, digital circuitry 6 and transceiver 3, as described above. Acquisition upon the selected system is then attempted in block 24 as described above.

If acquisition attempts have been made on all systems in MRU table 9, then MMSS 1 attempts acquisition on "fast acquisition" systems. An AMPS system is a typical example of a fast acquisition system. Although AMPS systems provide service that is inferior to the service that CDMA systems provide in terms of equality of service, it is possible to acquire an AMPS system in shorter a period of time. In block 34, if MMSS 1 has not attempted to acquire all fast acquisition systems, then, in block 36, system determination processor 8 selects a fast acquisition system and retrieves the acquisition parameters from universal system table 11. System determination processor 8 selectively provides the system acquisition parameters to analog circuitry 4, digital circuitry 6, and transceiver 3, as described above. Acquisition upon the selected system is then attempted in block 24 as described above.

If acquisition attempts have been made on all "fast acquisition" systems, then MMSS 1 attempts acquisition of a representative system. In block 42, if MMSS 1 has not attempted to acquire all representative systems, then, in block 38, system determination processor 8 selects a representative system and retrieves the acquisition parameters from universal system table 11. System determination processor 8 selectively provides the system acquisition parameters to analog circuitry 4, digital circuitry 6, and transceiver 3, as described above. Acquisition upon the selected system is then attempted in block 24 as described above.

If acquisition attempts have been made on all "representative" systems in block 42, then MMSS 1 exhaustively attempts acquisition on the remaining systems in universal system table 11. In block 44, if there are preferred systems in universal system table 11 upon which acquisition attempts have not been made, then the flow moves to block 40. In block 40, system determination processor 8 selects a remaining preferred system upon which to attempt acquisition, and retrieves the acquisition parameters from universal system table 11 and selectively provides the system acquisition parameters to analog circuitry 4, digital circuitry 6 and transceiver 3, as described above.

Acquisition upon the selected system is then attempted in block 24 as described above. If attempts to acquire all preferred systems have failed, then in the exemplary embodiment, MMSS 1 temporarily powers down to save battery power in block 46, then begins the process of preferred system selection over again at a later predetermined time, in block 20. There are several possible alternative courses of action. One possible alternative is that MMSS 1 simply powers down. A second possible alternative is that MMSS 1 begins the process of preferred system selection over again immediately. A third possible alternative, is that MMSS 1 indicates the failure and awaits user intervention.

Upon successful acquisition, MMSS 1 receives the system identification (SID) which is broadcast by the acquired system in block 27. The signal is received through antenna 5 and provided to transceiver 3 where the message signal is down converted and amplified. If the acquired system is analog, the message is provided to analog circuitry 4, which demodulates the signal in accordance with an analog demodulation format and provides the system identification information to system determination processor 8. If the acquired system is a CDMA system, the message is provided to digital circuitry 6, which demodulates the signal in accordance with a CDMA demodulation format and provides the system identification information to system determination processor 8.

In block 35, system determination processor 8 determines whether the received SID is one of the systems stored in universal system table 11. If the acquired system is unknown to MMSS 1, then the flow is passed back to block 25 and MMSS 1 attempts to acquire a different system. In the exemplary embodiment, the acquisition parameters of the acquired but unknown system are retained by system determination processor 8 and that system may be used if no preferred system can be acquired.

If the received system identification (SrD) is listed as a "negative" system in universal system table 11, then system determination processor 8 passes control to block 25 and MMSS 1 attempts to acquire a different system. In a preferred embodiment, the acquisition parameters of the acquired system are retained by system determination processor 8 and that system is used if an emergency call is originated.

If the received system identification (SID) is listed in universal system table 11, then system determination processor 8 determines whether this is a most desirable system for the geographical area in block 48. It is envisioned that there may be more than one system, which is equally desirable for use by the subscriber station. If the acquired system is a most desirable system for the geographical region, then service is provided using the acquired system in block 50. Upon completion of service, system determination processor 8 updates MRU table 9, in block 52.

If the received system identification is not a most desirable system for the geographical region, then system determination processor 8 in block 54 selects a most desirable system for the region and selectively provides the system acquisition parameters to analog circuitry 4, digital circuitry 6, and transceiver 3, as described above. In block 56, MMSS 1 attempts acquisition on a most desirable system in the geographical region. If acquisition is successful and the acquired system is the system the subscriber station was expecting to acquire in block 58, MMSS 1 provides service using the acquired system in block 60. In block 62, system determination processor 8 updates MRU table 9 upon completion of service.

If acquisition is unsuccessful, then in block 64, system determination processors 8 selects a next most desirable system for use in the geographic region. System determination processor 8 selectively provides the system acquisition parameters to analog circuitry 4, digital circuitry 6, and transceiver 3, as described above. This process repeats until acquisition is successful and MMSS 1 provides service using the acquired system in block 60. In the exemplary embodiment, if no systems can be acquired, in block 66, MMSS 1, MMSS 1 temporarily powers down to save battery power in block 68 and then begins the process of preferred system selection over again at a later predetermined time in block 20. There are several possible alternative courses of action. One possible alternative is that MMSS 1 simply powers down. A second possible alternative is MMSS 1 begins the process of preferred system selection over again immediately. A third possible alternative, is that MMSS 1 indicates the failure and awaits user intervention.

In an alternative embodiment, upon successful acquisition in block 48, system determination processor 8 determines if the system is preferred. If it is a preferred system, then MMSS 1 provides service using the acquired system and intermittently re-enters the system determination substate to check if a more desirable system in the area can be acquired.

In the exemplary embodiment, the information stored in universal system table 11 provides a bit that indicates whether the associated system is more desirable than the following listed system (bit=1) or the same degree of desirability (bit=0). This allows for multiple preferred systems within the same geographic region. Table 1 illustrates the exemplary method of indicating the level of desirability of the system within a geographic region.

TABLE 1

| SID  | Geo Bit | More Desirable Bit |
|------|---------|--------------------|
| 1111 | 0       | 1                  |
| 2222 | 0       | 0                  |
| 3333 | 0       | 0                  |
| 4444 | 0       | 1                  |
| 5555 | 0       | 0                  |
| 6666 | 1       | 0                  |
| 7777 | 1       | 0                  |
| 8888 | 1       | 0                  |

In Table 1, there are 2 different geographical regions present. Note that systems of a common geographic region are indicated by the geographic region bit (Geo Bit). Thus, the systems covering the first geographic region are 1111, 222, 333, 4444 and t555, and the systems covering the second geographic region are 666, 7777, and 8888. This is indicated by the flip in the polarity of the Geo Bit.

The desirability of a system within a geographic region is indicated by the polarity of the More Desirable Bit. Within the first geographic region, System 1111 is more desirable than System 2222. Systems 2222, 3333, and 4444 are equally desirable and all three are more desirable than 5555. Within the second geographic region, Systems 6666, 7777, and 8888 are all equally desirable. It should be noted that this method of indicating the geographic region which a system serves and the desirability of acquiring service through that system are exemplary and other methods of storing this information are possible.

In the Table 1 above, system 1111 may be referred to as a first preferred subset of SIDs for that geographic region. Systems 2222, 3333, and 4444 are equally desirable and may be referred as a second preferred subset of SIDs for that geographic region. Similarly, system 5555 may be referred the third preferred subset of SIDs for the geographic region. As noted above, in the examplary, embodiment of universal system table 11, the table consists of both preferred and negative systems. So, for example, that system 5555 could be a negative system and would not be referred to as a third preferred subset but rather would be an element of the negative set of system for that geographic area.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A subscriber station apparatus comprising:
    a Universal System Table having a predetermined set of parameters for each of a plurality of communication systems, the predetermined set of parameters comprising system identification code and geographic region; and
    a System Determination Processor configured to receive a first system identification code sent by a first communication system that indicates the system identity of the first communication system, wherein the System Determination Processor is further configured to select a second communication system that provides service in the same geographic region as the first communication system based on the first system identification code and the contents of said Universal System Table.

2. The subscriber station apparatus of claim 1 further comprising:
   a receiver configured to downconvert a received wireless signal to produce a first downconverted signal; and
   a first modulation module configured to demodulate and decode the first downconverted signal containing the first system identification code and configured to provide the first system identification code to said System Determination Processor.

3. The subscriber station apparatus of claim 2 further comprising a second modulation module configured to demodulate and decode a second downconverted signal received from the second communication system.

4. The subscriber station apparatus of claim 2 wherein the predetermined set of parameters further comprises acquisition parameters corresponding to the first communication system, and wherein said System Determination Processor selects the first communication system from said Universal System Table and configures said receiver and said first modulation module to receive and decode the first system identification code received from the first communication system.

5. The subscriber station apparatus of claim 4 wherein said System Determination Processor is configured to select a home system associated with the subscriber station apparatus as the first communication system.

6. The subscriber station apparatus of claim 4 wherein said System Determination Processor is configured to select the communication most frequently used by the subscriber station apparatus as the first communication system.

7. The subscriber station apparatus of claim 4 wherein said System Determination Processor is configured to select the communication system most recently used by the subscriber station apparatus as the first communication system.

8. The subscriber station apparatus of claim 4 wherein said System Determination Processor is configured to select the first communication system based on which communication system transmits signals that are easy for the subscriber station apparatus to acquire.

9. The subscriber station apparatus of claim 4 wherein said System Determination Processor is configured to select the first communication system based on the number of other communication systems in the Universal System Table that have parameters in common with the parameters of the first communication system.

10. The subscriber station apparatus of claim 2 wherein the predetermined set of parameters further comprises acquisition parameters corresponding to the second communication system, and wherein said System Determination Processor configures said receiver and said first modulation module to receive and decode a second system identification code from the second communication system.

11. The subscriber station apparatus of claim 1 wherein the sets of parameters in said Universal System Table are sorted by geographic region.

12. The subscriber station apparatus of claim 11 wherein the sets of parameters in said Universal System Table associated with communication systems that provides service in the same geographic region are further sequentially ordered based on desirability of each communication system.

13. The subscriber station apparatus of claim 1 wherein said Universal System Table comprises a non-volatile memory.

14. The subscriber station apparatus of claim 1 wherein said Universal System Table comprises a non-volatile memory.

15. The subscriber station apparatus of claim 1 wherein the predetermined set of parameters further comprises cost of service of the associated communication system, and wherein said System Determination Processor is configured to select the second communication system based on the cost of service of the second communication system.

16. The subscriber station apparatus of claim 1 wherein the predetermined set of parameters further comprises quality of service of the associated communication system, and wherein said System Determination Processor is configured to select the second communication system based on the quality of service of the second communication system.

17. The subscriber station apparatus of claim 1 wherein the predetermined set of parameters further comprises support of specific features in the associated communication system, and wherein said System Determination Processor is configured to select the second communication system based on whether the second communication system supports the specific features.

18. The subscriber station apparatus of claim 1 wherein the predetermined set of parameters further comprises whether the associated communication system is a preferred system, and wherein said System Determination Processor is configured to select the second communication system based on whether the second communication system is a preferred system.

19. The subscriber station apparatus of claim 1 wherein the predetermined set of parameters further comprises whether the associated communication system is a negative system, and wherein said System Determination Processor is configured to select a second communication system that is not a negative system.

20. The subscriber station apparatus of claim 1 wherein said System Determination Processor is a microprocessor.

21. The subscriber station apparatus of claim 1 further comprising a Most Recently Used System Table containing a list of most recently used systems, wherein said System Determination Processor chooses the first communication system based on the contents of said Most Recently Used System Table.

22. The subscriber station apparatus of claim 21 wherein said Most Recently Used System Table comprises a non-volatile memory.

23. The subscriber station apparatus of claim 1 further comprising a digital modulation module configured to demodulate and decode a received signal containing the first system identification code and configured to provide the first system identification code to said System Determination Processor.

24. The subscriber station apparatus of claim 23 wherein said digital modulation module is a CDMA demodulation module.

25. The subscriber station apparatus of claim 23 wherein said digital modulation module is a TDMA demodulation module.

26. The subscriber station apparatus of claim 23 wherein said digital modulation module is a GSM demodulation module.

27. The subscriber station apparatus of claim 1 further comprising an analog modulation module configured to demodulate and decode a received signal containing the first system identification code and configured to provide the first system identification code to said System Determination Processor.

28. A subscriber station apparatus comprising:
   means for storing a predetermined set of parameters for each of a plurality of communication systems, the predetermined set of parameters comprising system identification code and geographic region; and means for receiving a first system identification code belonging to a first communication system and selecting a second communication system that provides service in the same geographic region as the first communication system based on the first system identification code and the contents of said Universal System Table.

29. A method for selecting a communication system for acquisition by a subscriber station, the method comprising:

receiving from a first communication system a single system identification code indicative of the system identity of said first communication system;

referring to a table previously stored within the subscriber station to determine, based on said single system identification code, at least one other communication system, having a different system identification code than said received system identification code and which operates in a same geographical region as said first communication system;

selecting a most preferred communication system within the geographical region based on a set of communication system attributes associated with each communication system in the table; and attempting acquisition upon the most preferred communication system.

30. The method of claim 29 wherein the set of communication system attributes includes a cost of service value, and wherein the step of selecting further comprises selecting the most preferred communication system based on the cost of service values associated with the communication systems in the geographical region.

31. The method of claim 29 wherein the set of communication system attributes includes a quality of service value, and wherein the step of selecting further comprises selecting the most preferred communication system based on the quality of service values associated with the communication systems in the geographical region.

32. The method of claim 29 wherein the set of communication system attributes includes whether each communication system supports a unique feature, and wherein the step of selecting further comprises selecting the most preferred communication system based on which communication systems in the geographical region support the unique feature.

33. The method of claim 29 wherein the set of communication system attributes includes whether each communication system is a preferred system, and wherein the step of selecting further comprises selecting the most preferred communication system based on which communication systems in the geographical region are preferred systems.

* * * * *

UNITED STATES PATENT AND TRADEMARK OFFICE
CERTIFICATE OF CORRECTION

PATENT NO. : 6,466,802 B1 Page 1 of 1
DATED : October 15, 2002
INVENTOR(S) : Blakeney, II et al.

It is certified that error appears in the above-identified patent and that said Letters Patent is hereby corrected as shown below:

Column 11,
Line 8, delete "said" and insert -- an --.

Signed and Sealed this

Twenty-ninth Day of July, 2003

JAMES E. ROGAN
*Director of the United States Patent and Trademark Office*